US010426675B1

(12) United States Patent
Erickson

(10) Patent No.: US 10,426,675 B1
(45) Date of Patent: Oct. 1, 2019

(54) ANTI-COLLISION SYSTEM FOR PERSONAL MOBILITY SCOOTERS

(71) Applicant: Kevin Erickson, Vancouver, WA (US)

(72) Inventor: Kevin Erickson, Vancouver, WA (US)

(*) Notice: Subject to any disclaimer, the term of this patent is extended or adjusted under 35 U.S.C. 154(b) by 18 days.

(21) Appl. No.: 16/004,230

(22) Filed: Jun. 8, 2018

Related U.S. Application Data

(60) Provisional application No. 62/516,955, filed on Jun. 8, 2017.

(51) Int. Cl.
*A61G 5/04* (2013.01)
*A61G 5/10* (2006.01)

(52) U.S. Cl.
CPC .......... *A61G 5/04* (2013.01); *A61G 5/10* (2013.01); *A61G 2203/30* (2013.01); *A61G 2203/72* (2013.01)

(58) Field of Classification Search
None
See application file for complete search history.

(56) References Cited

U.S. PATENT DOCUMENTS

| 2004/0060757 A1* | 4/2004 | Plante | G01S 17/936 180/169 |
| 2013/0201316 A1* | 8/2013 | Binder | H04L 67/12 348/77 |
| 2015/0332590 A1* | 11/2015 | Salomonsson | G08G 1/167 701/28 |

* cited by examiner

*Primary Examiner* — John Olszewski
*Assistant Examiner* — Gerrad A Foster
(74) *Attorney, Agent, or Firm* — Rutan & Tucker, LLP

(57) ABSTRACT

An anti-collision system for use by a mobility scooter to reduce collisions between the mobility scooter and objects or ledges is disclosed. The system comprising an input/output communication interface and an anti-collision circuitry configured to: receive a movement signal from the mobility scooter, the movement signal signaling a movement variable and a direction, receive proximity data from one or more proximity sensors through the input/output communication interface, perform a determination as to whether the received proximity data indicates the mobility scooter is within a proximity threshold, wherein the proximity threshold corresponds to the movement variable, and in response to determining the received proximity data indicates the mobility scooter is within the proximity threshold, provide one or more control signals to a controller, the controller in communication with at least a motor or a brake of the mobility scooter.

20 Claims, 9 Drawing Sheets

US 10,426,675 B1

ANTI-COLLISION SYSTEM FOR PERSONAL MOBILITY SCOOTERS

CROSS-REFERENCE TO RELATED APPLICATION

This application claims priority to U.S. Provisional Application Ser. No. 62/215,955, filed Jun. 8, 2017, the contents of which are hereby incorporated by reference herein in their entirety.

FIELD

Embodiments of the disclosure relate to the field of mobility scooters. More specifically, embodiments of the disclosure relate to a system, method and apparatus for preventing collisions between a mobility scooter and an object or a ledge.

GENERAL BACKGROUND

The increased popularity of personal mobility scooters has improved the quality of life for countless numbers of elderly and disabled people. However, the use of these scooters in confined spaces such as hallways and elevators has led to a rise in the injury rate of not only users, but of other people who collide with a moving mobility scooter.

SUMMARY OF THE INVENTION

In its most general aspect, the invention includes an anti-collision system for use by a mobility scooter to reduce the occurrence of collisions between the mobility scooter and objects and/or persons, comprising: a proximity sensor configured to provide data representing a distance between the proximity sensor and an object detected by the proximity sensor; an anti-collision controller unit, having a processor, a memory associated with the processor, and an input/output communication interface, the processor configured using programming command to receive the data from the proximity sensor through the input/output communication input/output interface, compare the received data to data representing predetermined values for at least one movement variable, and, depending on a value derived from the comparison, provide control signals to a control unit in communication with a motor and/or brake of the mobility scooter.

What has been needed, and heretofore unavailable, is mobility scooter having an anti-collision system that is capable of detecting objects or people in the scooters path, and taking corrective action to avoid or reduce collisions and minimize injury or damage. In addition, more so than merely a mobility scooter having an anti-collision system is an anti-collision system that may be easily installed in existing mobility scooters. Specifically, as thousands, if not millions, of people or businesses own mobility scooters, it would be advantageous for a system, method and apparatus to exist that provides anti-collision abilities for existing mobility scooters while also being easily installable into the existing mobility scooters. Thus, in one embodiment, such a system, method and apparatus would enable a current owner of a mobility scooter to purchase the anti-collision system and quickly install the anti-collision system into their mobility scooter.

In one embodiment, an anti-collision system for use by a mobility scooter to reduce collisions between the mobility scooter and objects or ledges is disclosed and comprises an input/output communication interface; and an anti-collision circuitry configured to: receive a movement signal from the mobility scooter, the movement signal signaling a movement variable and a direction, receive proximity data from one or more proximity sensors through the input/output communication interface, perform a determination as to whether the received proximity data indicates the mobility scooter is within a proximity threshold, wherein the proximity threshold corresponds to the movement variable, and in response to determining the received proximity data indicates the mobility scooter is within the proximity threshold, provide one or more control signals to a controller, the controller in communication with at least a motor or a brake of the mobility scooter.

In one embodiment, the anti-collision system further comprises a proximity sensor communicatively coupled to the anti-collision circuitry and configured to provide proximity data that represents a distance between the proximity sensor and an object or ledge detected by the proximity sensor.

In one embodiment, the anti-collision system the at least one movement variable includes at least one of accelerate, decelerate, or maintain a current speed.

In one embodiment, the anti-collision system the anti-collision circuitry includes one or more processors.

In one embodiment, the anti-collision system the anti-collision circuitry includes one or more transistors, wherein each of the one or more transistors is configured to analyze proximity signals received from a predefined set of proximity sensors.

In one embodiment, the anti-collision system the one or more control signals indicate an alert is to be generated, the alert including at least one of haptic feedback, an audible alert or a visual alert.

In one embodiment, the anti-collision system the haptic feedback includes a vibration of a steering wheel of the mobility scooter.

In one embodiment, a method for reducing collisions between a mobility scooter and objects or ledges is disclosed, the method comprising receiving a movement signal from the mobility scooter, the movement signal signaling a movement variable and a direction, receiving proximity data from one or more proximity sensors through the input/output communication interface, performing a determination as to whether the received proximity data indicates the mobility scooter is within a proximity threshold, wherein the proximity threshold corresponds to the movement variable, and in response to determining the received proximity data indicates the mobility scooter is within the proximity threshold, providing one or more control signals to a controller, the controller in communication with at least a motor or a brake of the mobility scooter.

In one embodiment, the method further comprises detecting, by a proximity sensor communicatively coupled to the mobility scooter, proximity data that represents a distance between the proximity sensor and an object or ledge detected by the proximity sensor.

In one embodiment of the method, the at least one movement variable includes at least one of accelerate, decelerate, or maintain a current speed.

In one embodiment of the method, the mobility scooter includes an anti-collision circuitry including one or more processors.

In one embodiment of the method, the mobility scooter includes an anti-collision circuitry including one or more transistors, wherein each of the one or more transistors is configured to analyze proximity signals received from a predefined set of proximity sensors.

In one embodiment of the method, the one or more control signals indicate an alert is to be generated, the alert including at least one of haptic feedback, an audible alert or a visual alert.

In one embodiment of the method, the haptic feedback includes a vibration of a steering wheel of the mobility scooter.

In one embodiment, an apparatus for reducing collisions between a mobility scooter and objects or ledges is disclosed, wherein the system comprises an input/output communication interface and an anti-collision circuitry configured to: receive a movement signal from the mobility scooter, the movement signal signaling a movement variable and a direction, receive proximity data from one or more proximity sensors through the input/output communication interface, perform a determination as to whether the received proximity data indicates the mobility scooter is within a proximity threshold, wherein the proximity threshold corresponds to the movement variable, and in response to determining the received proximity data indicates the mobility scooter is within the proximity threshold, provide one or more control signals to a controller, the controller in communication with at least a motor or a brake of the mobility scooter.

In one embodiment, the apparatus further comprises a proximity sensor communicatively coupled to the anti-collision circuitry and configured to provide proximity data that represents a distance between the proximity sensor and an object or ledge detected by the proximity sensor.

In one embodiment of the apparatus, the at least one movement variable includes at least one of accelerate, decelerate, or maintain a current speed.

In one embodiment of the apparatus, the anti-collision circuitry includes one or more processors and one or more transistors, wherein each of the one or more transistors is configured to analyze proximity signals received from a predefined set of proximity sensors.

In one embodiment of the apparatus, the one or more control signals indicate an alert is to be generated, the alert including at least one of haptic feedback, an audible alert or a visual alert.

In one embodiment of the apparatus, the haptic feedback includes a vibration of a steering wheel of the mobility scooter.

Other features and advantages of the present invention will become apparent from the following detailed description, taken in conjunction with the accompanying drawings, which illustrate, by way of example, the principles of the invention. The present invention satisfies these and other needs.

BRIEF DESCRIPTION OF THE DRAWINGS

Embodiments of the present inventive concept are illustrated by way of example in which like reference numerals indicate similar elements and in which.

DETAILED DESCRIPTION

Figure 1:
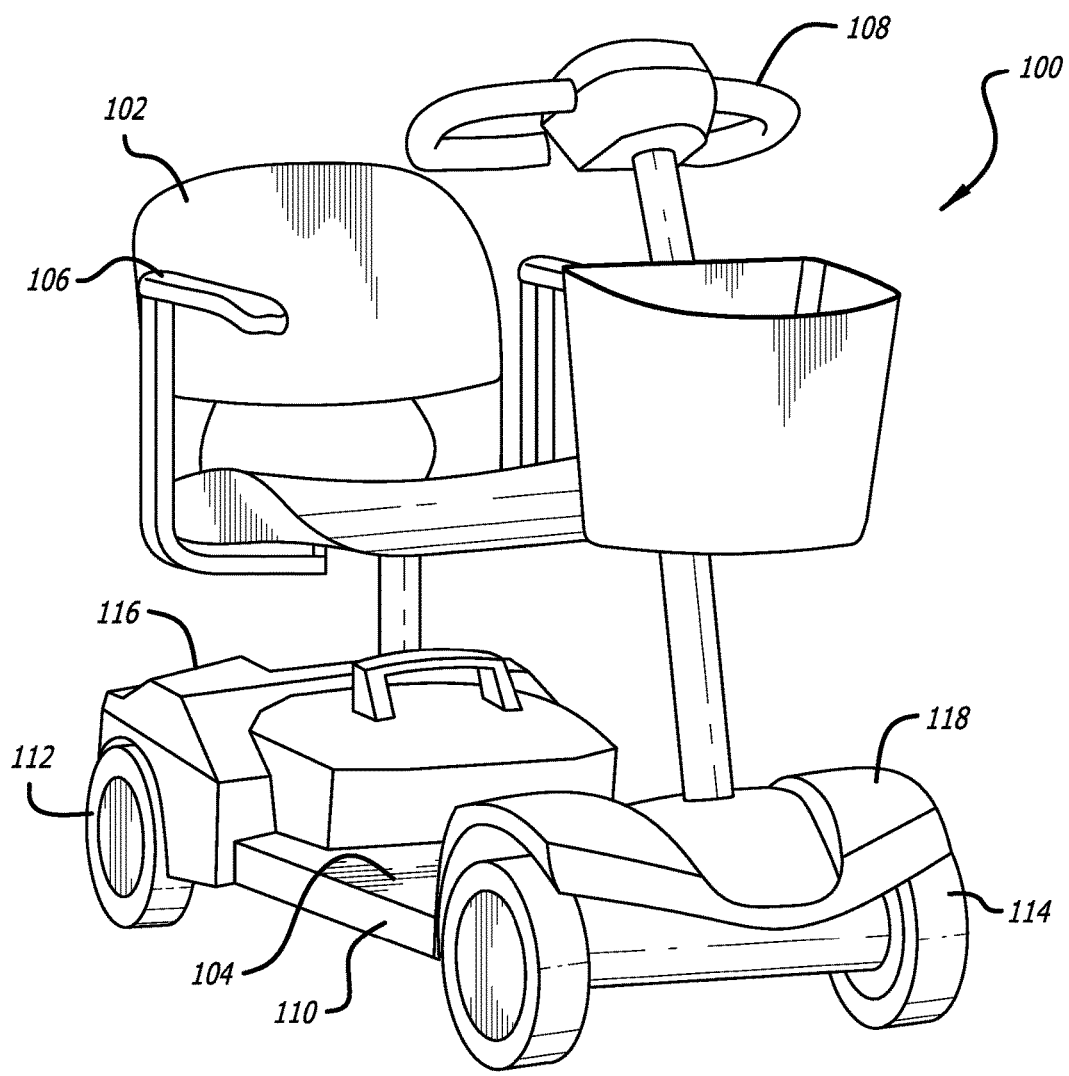
FIG. 1 is a perspective view illustrating a typical mobility scooter in accordance with some embodiments.

In its most general embodiment, the anti-collision system of the present invention is coupled to a mobility scooter ("scooter") having a controller that accepts inputs related to various parameters, such as a key switch to actuate the system, a throttle, direction, speed limit, and a horn button. The anti-collision system is configured to intercept signals transmitted between the scooter and the controller and receive data from sensors, e.g., proximity sensors. The anti-collision system may analyze the intercepted signals and the data received from the sensors according to predetermined rule sets. Based on the analysis, the anti-collision system may provide one or more signals to the controller and/or the scooter. The signals provided by the anti-collision system are intended to prevent a collision between the scooter and an object or a ledge, which may include initiating the application of a braking system of the scooter, generating an alert for the user, etc.

The controller and/or the anti-collision system may also receive data from sources, such as an accelerometer, an orientation sensor and/or other such sensors, either directly (such as through a direct connection to a sensor), or through a network connection or gateway, an application programming interface (API), or through an accessory port (such as enabling access to the sensors of accessories, peripherals or external systems that connect to the wheel through the accessory port). Based on the calculation and/or analysis of, for example, sensed torque, acceleration, motion, orientation, etc., the anti-collision system determines whether power should be applied to a motor through a motor control system to cause acceleration or deceleration of the scooter. Deceleration may be effectuated by application of power to the motor to generate a rotational force opposite that of the current rotation, by reducing the level of rotational force in the same direction, such as in cases where the effects of gravity, friction, wind resistance, or the like are enough to induce deceleration on the vehicle in the absence of continued levels of rotational force, or by application of power to a braking system while reducing power applied to the motor.

In one embodiment, the anti-collision system may be interjected in the connection between the scooter and the controller. In addition, the scooter includes a set of sensors, e.g., proximity sensors and/or cameras, which may be included on the scooter and/or may be installed after-market, e.g., as part of the anti-collision system. Following installation of the anti-collision system in the connection between the scooter and the controller, the anti-collision system may intercept signals intended for transmission between the scooter and the controller. The anti-collision system may also receive signals from the sensors in a concurrent (at least partially overlapping in time) manner. For example, the user may provide input to the accelerator causing a signal to be sent from the scooter to the controller to initiate the motor and the signal may be intercepted by the anti-collision system. The anti-collision system may analyze the intercepted signal as well as data received from the sensors (i.e., proximity to an object, stairs, ledge, etc. in front of the scooter). Based on the analysis, the anti-collision system may either transmit (i) the original signal to the controller causing the controller to initiate the motor or (ii) an alternative signal to the controller, which may cause inaction by the controller or an action alternative to initiating the motor. For example, an alternative signal may instead cause the controller to transmit a signal causing an alert to be provided to the user indicating the proximity to the object, cliff, ledge, etc. In some embodiments, such an alert may include a vibration of the a steering wheel and/or seat, a beep from the horn and/or an alternative audio indication, etc.

I. Terminology

In the following description, certain terminology is used to describe various features of the invention. For example, each of the terms "logic" and "component" may be representative of hardware, firmware or software that is configured to perform one or more functions. As hardware, the term logic (or component) may include circuitry having data processing and/or storage functionality. Examples of such circuitry may include, but are not limited or restricted to a hardware processor (e.g., microprocessor, one or more processor cores, a digital signal processor, a programmable gate array, a microcontroller, an application specific integrated circuit "ASIC", etc.), a semiconductor memory, or combinatorial elements.

Additionally, or in the alternative, the logic (or component) may include software such as one or more processes, one or more instances, Application Programming Interface(s) (API), subroutine(s), function(s), applet(s), servlet(s), routine(s), source code, object code, shared library/dynamic link library (dll), or even one or more instructions. This software may be stored in any type of a suitable non-transitory storage medium, or transitory storage medium (e.g., electrical, optical, acoustical or other form of propagated signals such as carrier waves, infrared signals, or digital signals). Examples of a non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or component) may be stored in persistent storage.

The term "transmission medium" may be construed as a physical or logical communication path between two or more network devices or between components within a network device. For instance, as a physical communication path, wired and/or wireless interconnects in the form of electrical wiring, optical fiber, cable, bus trace, or a wireless channel using radio frequency (RF) or infrared (IR), may be used. A logical communication path may simply represent a communication path between two or more network devices or between components within a network device.

Finally, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

II. General Architecture

Figure 2:
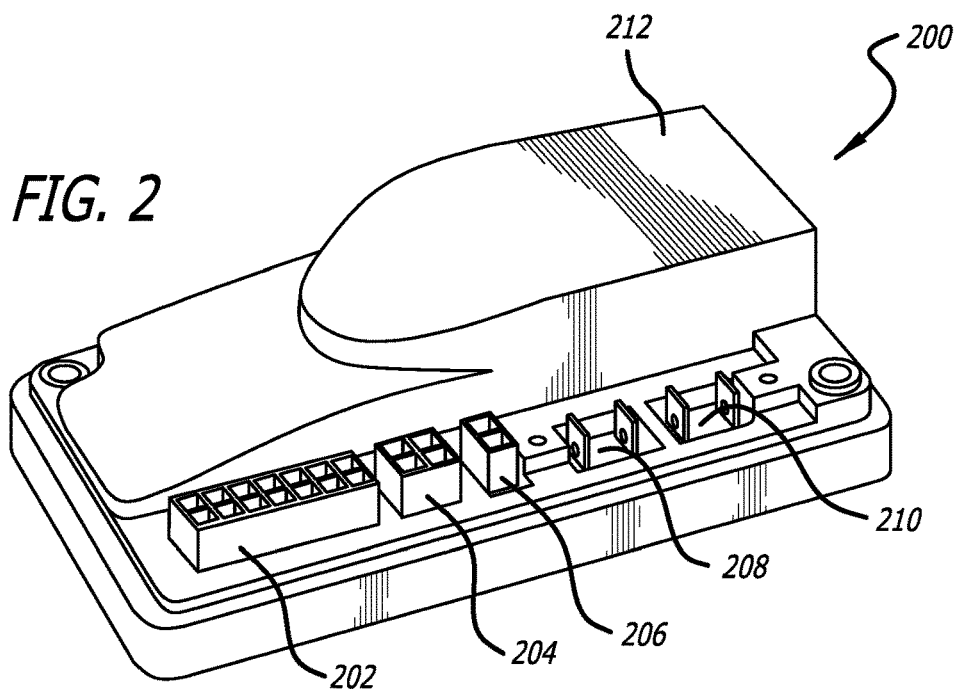
FIG. 2 is a perspective view illustrating a typical central control unit used to control movement of the mobility scooter of FIG. 1 in accordance with some embodiments.

Referring now to FIG. 1, a typical powered mobility scooter 100 is shown in accordance with some embodiments. Such a vehicle has a seat 102, footrest 104, and armrests 106 to accommodate the user. A steering control module 108 with which the user operates the vehicle is mounted to the scooter. The seat 102 and footrest 104 are mounted to a body 110, which houses the units battery, motor, and control unit. The scooter 110 additionally includes a plurality of wheels, typically a pair of main drive wheels 112 and a set of forward wheels 114 that are used to steer the scooter. In addition, the body 110 includes a rear body component 116 and a front body component 118. Referring to FIG. 2, a typical central control unit 200 (also referred to as a "controller") that is used with mobility scooters is shown in accordance with some embodiments. For example, the central control system may be an electronic motor controller such as the Curtis Model 1212 Motor Speed Controller available from Curtis Instruments, Inc., although similar electronic motor controls may be used. Such a control unit will include a processor and associated memory as well as one or more communication ports for receiving and transmitting signals to and from the processor. Other circuits may be included as needed to provide for proper operation of the various systems of the scooter 100, such as receiving operating and proximity sensor signals and for providing feedback, alerts, and/or other messages or notifications to the user of the scooter. Installation of such an electronic motor controller is shown mounted to a mobility scooter in at least FIG. 3A.

In particular, the controller 200 includes a controller interface having five interface blocks 202, 204, 206, 208, and 210. Interface block 202 is a 14-pin sensor interface for receiving sensor inputs which may be analyzed by the controller 200 and then acted on by the processor of the controller 200 to control the operation of the scooter 100. Interface block 204 is a 4-pin factory programming interface to allow programming commands embodied in software and/or hardware to be uploaded to the processor and memory of the controller 200. In one embodiment, the interface block 204 may be used to interface with a battery charger. As shown in at least FIGS. 3B-3D, wire 302 is shown in connection with the interface block 204. Interface block 206 is a 2-pin brake connector for communicating braking signals to the brakes of the scooter 100. In one embodiment, the interface block 208 has two quick connect motor terminals for communicating motor command signals to the motor; and interface block 210 has two quick connectors for connecting the electronic motor controller to a battery. Specifically, interface blocks 208 and 210 may each be ¼" Faston Terminals for high current motor connection, wherein interface block 208 may be a positive lead and interface block 210 may be a negative lead.

Figure 3A:
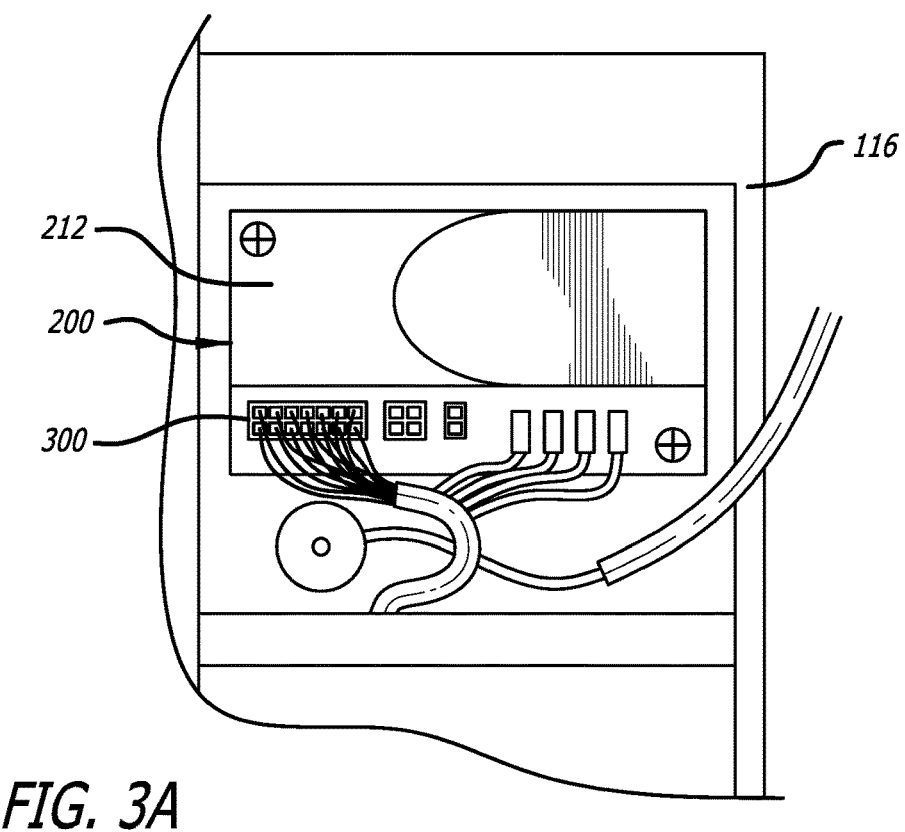
FIG. 3A is a top view illustrating a connection interface of the controller of FIG. 2 in accordance with some embodiments.

Referring to FIG. 3A, a top view illustrating a connection interface of the controller 200 of FIG. 2 is shown in accordance with some embodiments. In particular, the illustration of FIG. 3A shows the controller 200 located within the rear body component 116 of the scooter 100. The controller 200 is shown having a cover 212 and connected to a 14-pin connector 300 of the scooter. In one embodiment, the 14-pin connector 300 is a Molex Mini-Fit-Jr. 14-pin connector receptacle with series 45750-series crimp terminal. The 14-pin connector 300 may be configured to receive signals from various parts of the scooter 100 and transmit the received signals to the controller 200 when the anti-collision system 316, as seen in FIG. 3C, is not present. In one embodiment, each pin of the 14-pin connector 300 is a low-current logic control connection, wherein each pin may be configured to transmit data to various parts of the scooter 100 (e.g., "event X has happened, initiate reaction Y"). It should be noted, that FIG. 3A illustrates the connection between the scooter 100 and the controller 200 without inclusion of the anti-collision system 316.

The controller 200 includes electronic circuitry for monitoring the status of the various inputs. The controller 200 also includes the interface described above for communicating with the user of the scooter 100. This user input/output interface may include, for example, an on/off key switch, throttle, speed indicator, direction (forward or backward) indicator, a horn button, a collision warning device, such as a light or other visual and/or audible alert generator, and the like.

The one or more accessory devices, peripherals, or external systems may be coupled to the scooter 100 and in communication with the controller 200. Such accessory devices may include, various sensors, such as environmental sensors, and other sensors which may sense various physical parameters of the environment, in connection with the description of supplemental hardware and infrastructure elements. The controller 200 may process data collected and received from the various sources and channels described throughout this disclosure (including the accessory devices, peripherals and external systems referenced above), such as from the environmental sensors, other sensors, external devices, a mobile device, a supplemental hardware device, one or more APIs for external systems, through various networking channels, such as from servers, distributed storage systems, and the cloud, from force sensors, from user interface elements on the wheel, etc. The controller 200 may store data or cause data to be stored, such as in local memory associated with the of the controller 200, a separate data storage system, a removable data storage device, a server-based data storage system, and/or a cloud-based storage system. The accessory devices, peripherals, or external systems may communicate the data as required to the controller 200, and to the various other systems with respect to which it is in data communication as noted above (e.g., the accessories, sensors, peripherals, servers, storage systems, mobile devices and the like). In embodiments, and as described in more detail below, this may include communication of messages to the user through tactile input, such as a vibration, resistance, or the like, delivered to the user via the mechanical drive system.

Figure 3B:
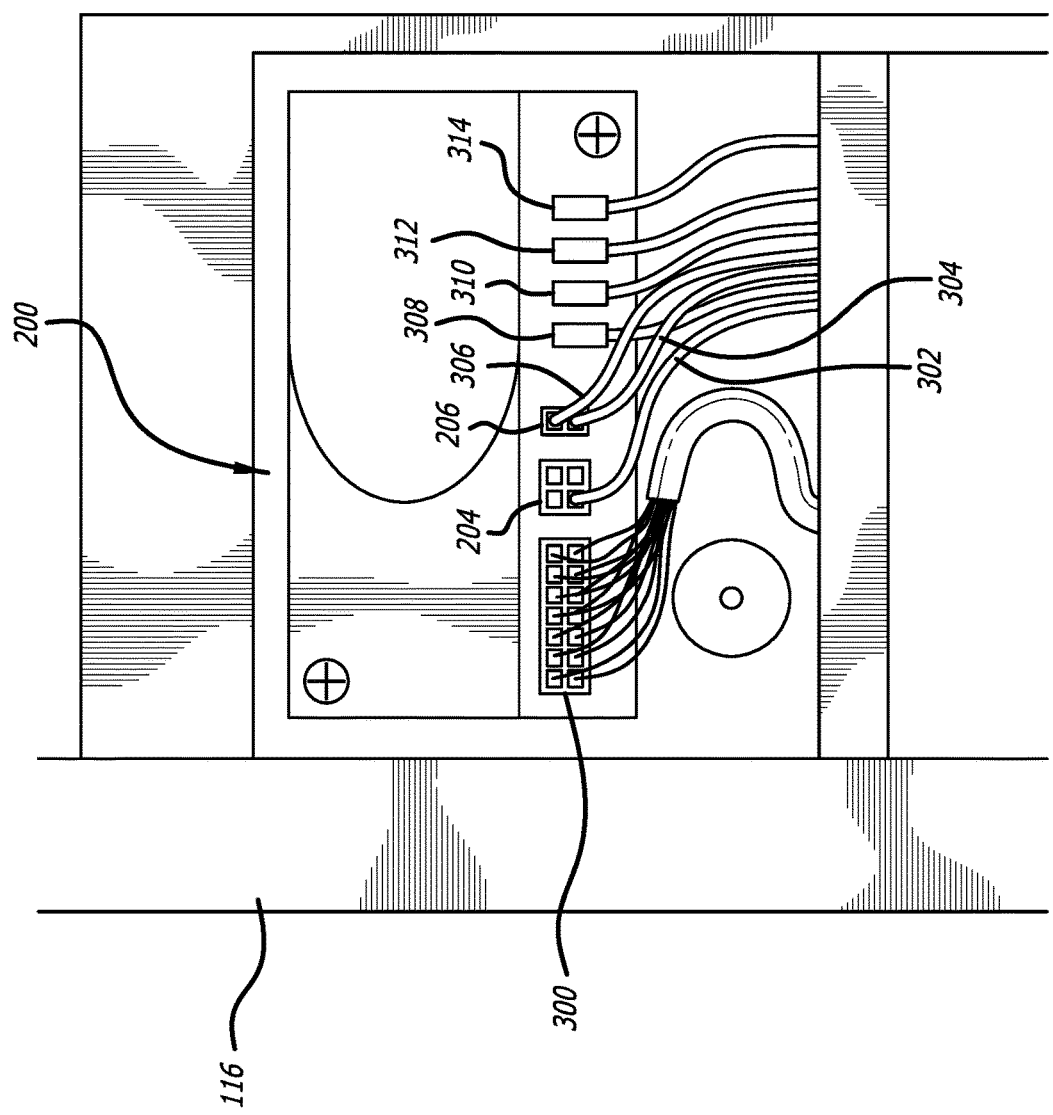
FIG. 3B a second top view illustrating a connection interface of the controller of FIG. 2 is shown in accordance with some embodiments.
Figure 3C:
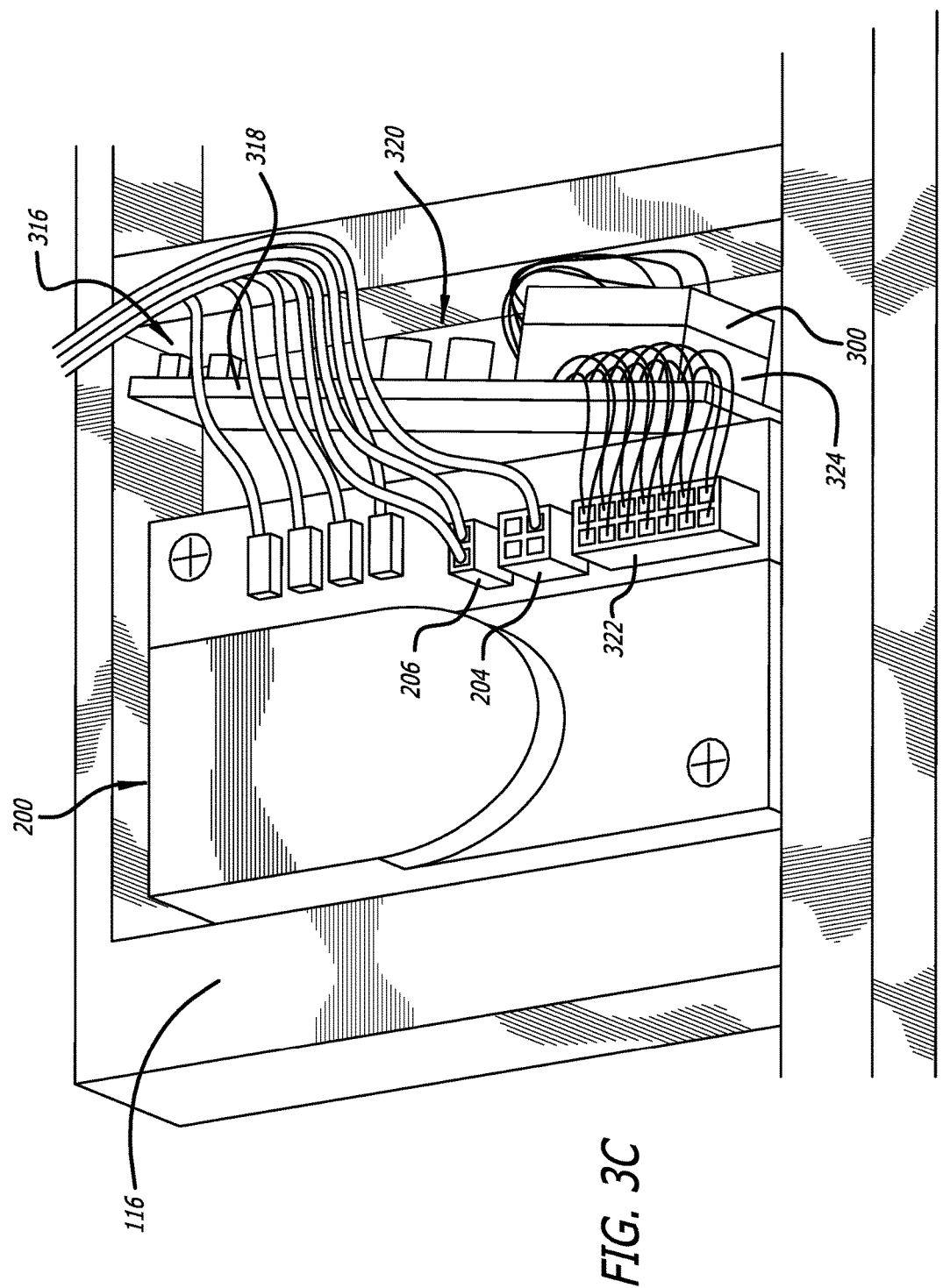
FIG. 3C is a side perspective view illustrating a connection interface of the controller of FIG. 2 in connection with the anti-collision system in accordance with some embodiments.

Referring now to FIG. 3B, a second top view illustrating a connection interface of the controller 200 of FIG. 2 is shown in accordance with some embodiments. As seen more clearly in FIG. 3B, connections between the scooter 100 and the controller 200 are shown. For example, FIG. 3B illustrates the 14-pin connector 300 connected to the controller 200, the wire 302 connected to the interface block 204 (e.g., to control charging of the battery in one embodiment), the connections of the wires 304 and 306 into the interface block 206 (e.g., to control the braking system in one embodiment), the connections of the wires 308 and 310 to the interface block 208 (e.g., to control the motor in one embodiment) and connections of the wires 312 and 314 to the interface block 210 (e.g., to control the use of the battery in one embodiment).

Referring to FIG. 3C, a side perspective view illustrating a connection interface of the controller 200 of FIG. 2 in connection with the anti-collision system 316 is shown in accordance with some embodiments. Specifically, the anti-collision system 316 is shown as being interjected between the connection between the scooter 100 and the controller 200. The illustrated configuration enables the anti-collision system 316 to intercept signals transmitted between the scooter 100 and the controller 200. The anti-collision system 316 may analyze the intercepted signals. Based on the results of the analysis, the anti-collision system 316 may transmit the intercepted signal to its intended destination or transmit an amended signal to the intended destination. For example, in the configuration of FIG. 3C, the 14-pin connector 300 of the scooter is shown as connected to the 14-pin connector 324 of the anti-collision system 316, which is in contrast to FIGS. 3A-3B in which the 14-pin connector 300 is connected to the interface block 202 of the controller 200. Such a configuration enables the anti-collision system 316 to intercept signals transmitted from the scooter 100 to the controller 200 via the 14-pin connector 300.

In addition, the anti-collision system 316 is shown as having a 14-pin connector 322 that is connected to the interface block 202 of the controller 200. Thus, intercepted signals transmitted via the 14-pin connector 300 may be analyzed by the anti-collision system 316 and resultant signals may be transmitted to the controller 200 via the 14-pin connector 322. The same sequence of intercepting and analyzing signals is applicable when signals are transmitted via the interface block 202 of the controller to the scooter 100.

In addition to the 14-pin connectors 322 and 324, the anti-collision system 316 may include a circuit board 318 and circuitry 320. Furthermore, the interjection of the anti-collision system 316 between the connection of the scooter 100 and the controller 200 need not affect other functionality of the scooter 100 and/or the controller 200. As is seen in the configuration of FIG. 3C, the anti-collision system 316 need not affect the connection of the wires 304 and 306 into interface blocks 204 and 206, respectively. In one embodiment, the connection of the wires 304 and 306 into interface blocks 204 and 206 may be used to transmit signals regarding the activation of a braking system of the scooter 100. Thus, the signals may be transmitted directly from the controller 200 to the braking system when the anti-collision system 316 is installed, but the anti-collision system 316 may, in response to a received or intercepted signal, provide a signal to the controller 200 that causes the controller 200 to transmit a specific signal to the braking system. In some embodiments, the 14-pin connector 324 of the anti-collision system 316 may be configured to receive signals from sensors, e.g., proximity sensors and/or cameras, via one or more pins. In addition, the same scenario applies for the connection between wires 308, 301, 312 and 314 and the plugs of interface blocks 208 and 210 as discussed above with respect to wires 304 and 306 and interface blocks 204 and 206.

Figure 3D:
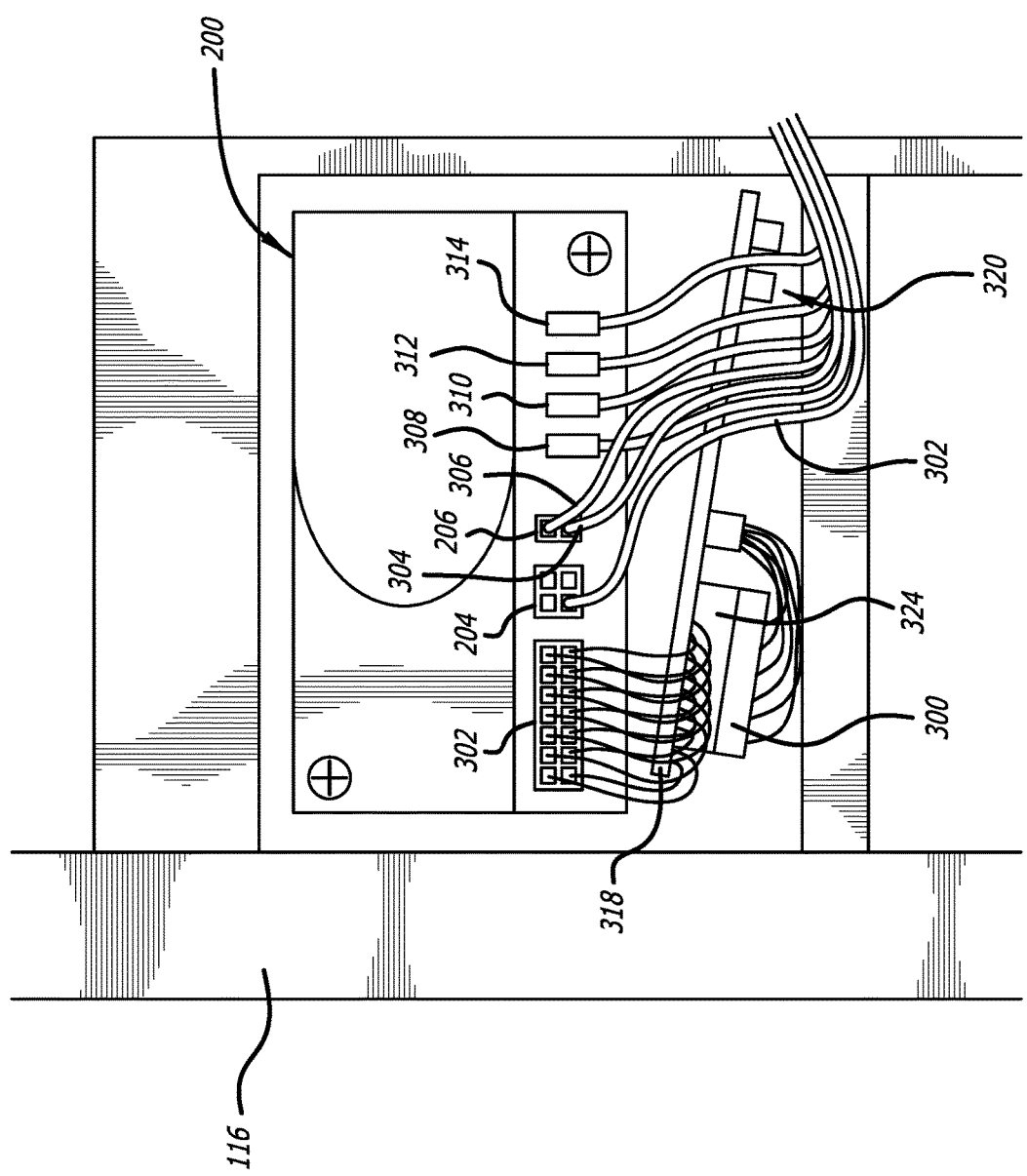
FIG. 3D is a top view illustrating a connection interface of the controller of FIG. 2 in connection with the anti-collision system in accordance with some embodiments.

Referring to FIG. 3D, a top view illustrating the connection of the anti-collision system 316 between the scooter 100 and the controller 200 is shown in accordance with some embodiments. As seen more clearly in FIG. 3D, the interjection of the anti-collision system 316 between the scooter 100 and the controller 200 need not affect the connections between various components of the scooter 100 and the controller 200. For example, FIG. 3D illustrates that, at least in one embodiment, the interjection of the anti-collision system 316 does not alter the connections pertaining to the charging of the battery of the scooter 100, e.g., wire 302 connected to interface block 206. In addition, the embodiment illustrated in FIG. 3D does not alter the connections pertaining to the motor (e.g., wires 308 and 310 in one embodiment) or the braking system (e.g., wires 312 and 314 in one embodiment). FIG. 3D also illustrates that the rear body component 116 may house both the controller 200 and the anti-collision system 316.

Figure 4A:
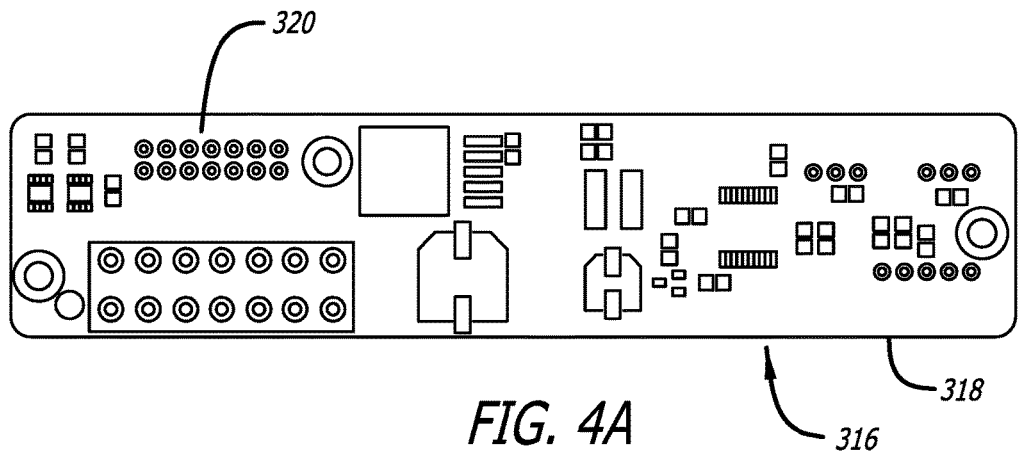
FIG. 4A is a top view of one embodiment of an anti-collision circuit board in accordance with some embodiments.
Figure 4B:
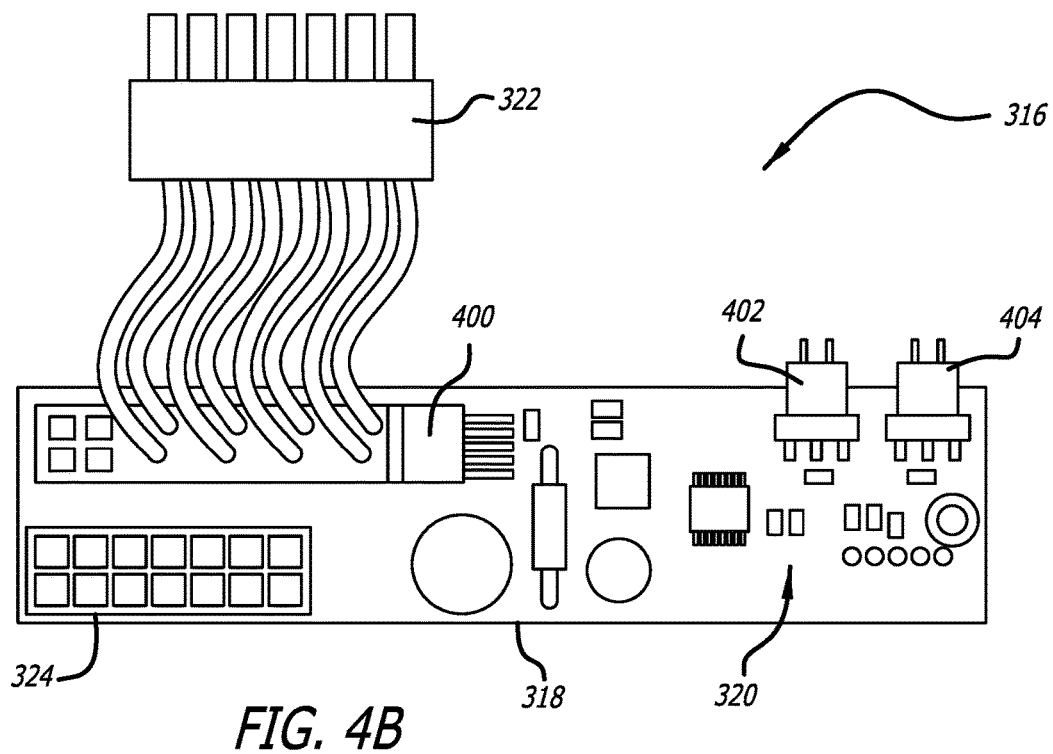
FIG. 4B is a second top view of one embodiment of the anti-collision system including a circuit board and circuitry in accordance with some embodiments.

Referring to FIG. 4A, an embodiment of a anti-collision system 316 including circuitry for receiving signals from sensors, such as proximity sensors, that may be used to enhance the operation of the controller 200 is shown in accordance with some embodiments. Referring now to FIG. 4B, a second top view of one embodiment of the anti-collision system 316 including a circuit board 318 and circuitry 320 in accordance with principles of the present invention is shown in accordance with some embodiments. In the illustrated embodiment, the circuitry 320 includes a plurality of transistors such as the transistors 400, 402 and 404. The transistors 400, 402 and 404 may be configured to execute instructions regarding to received signals. The instructions may be in accordance with predetermined rule sets that, among other functions, dictate predetermined proximity thresholds (e.g., proximity thresholds may differ based on whether an object is detected in front of, to the side or behind the scooter 100). Additionally, thresholds, actions taken by the scooter 100 and inaction by the scooter 100 may be dictated by one or more predetermined rule sets established in pre-configured instructions of the transistors 400, 402 and/or 404. In addition, one or more of the transistors 400, 402 and/or 404 may be configured to receive data from one or more proximity sensors. In one embodiment, the transistor 402 may receive data from one or more proximity sensors located and/or facing the front of the scooter 100 while the transistor 404 may receive data from one or more proximity sensors located and/or facing the rear of the scooter 100. Other configurations and the use of fewer or additional transistors have been contemplated and are not outside the scope of the disclosure. The anti-collision system 316 is also shown to include the 14-pin connectors 322 and 324 as discussed in at least FIGS. 3C-3D.

Figure 5:
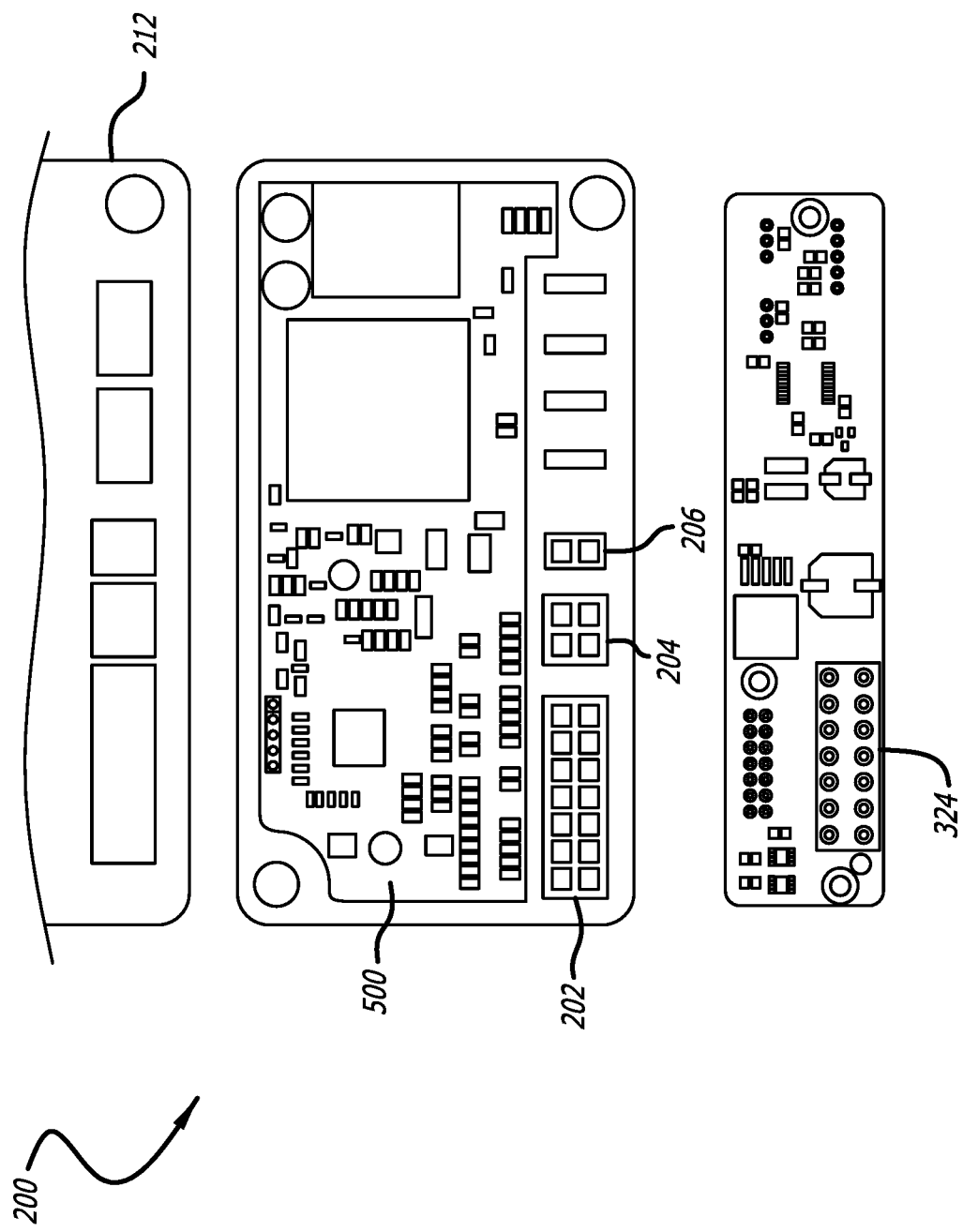
FIG. 5 is a top view illustrating an arrangement of the anti-collision circuit system of FIG. 4 configured to be connected to the circuitry of the controller of FIGS. 2-3 in accordance with some embodiments.

Referring now to FIG. 5, the anti-collision system 316 including a 14-pin sensor interface connector 324 configured to engage the 14-pin sensor interface 105 of the electronic motor controller unit 500 is shown in accordance with some embodiments. This allows anti-collision system 316 to be connected to the electronic motor controller unit 500 directly to facilitate communication of data related to proximity sensor operation and control commands to the electronic motor unit to assist in controlling the operation of the scooter 100 by controlling the operation of the motor and brakes of the scooter 100. The anti-collision system 316 may also transmit signals to the electronic motor control unit 500 that may then be interpreted by the processor of the electronic motor control unit 500 to provide alerts or other messages to the operation of the user, such as, for example, providing a visual, audible, and or tactile alert that a collision is imminent.

The anti-collision circuit system 316 may also include processor, such as a PIC 16F1829 microcontroller, available from Microchip Technologies, Inc. This processor may be programmed using software commands stored in an associated memory, or that are embedded into the microcontroller's circuitry. The communication interface of the anti-collision system 316 may be configured to receive inputs from the key switch, the throttle, and the horn button, or signals indicating the direction of travel of the scooter 100 and the speed that the scooter 100 is traveling. The communication may also be configured to transmit control signals to the electronic motor control unit 500 to alter the throttle setting, direction of travel, speed, horn and emergency brake actuation. The emergency brake signal may, for example, actuate the normal braking systems of the scooter 100 as well as commanding the electronic motor control unit 500 to issue a reverse throttle command to the motor to attempt to reverse the direction of rotation of the motor of the scooter 100.

Figure 6:
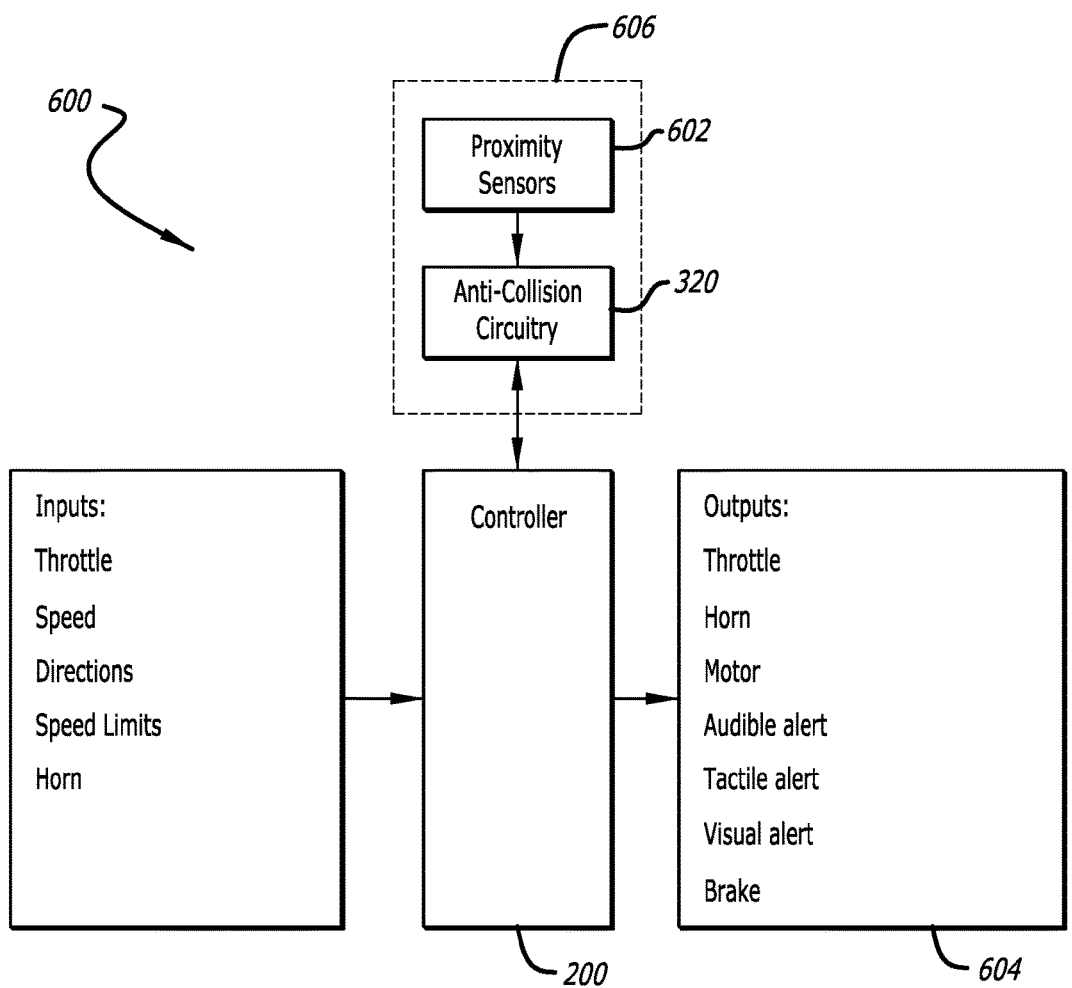
FIG. 6 is a block diagraph illustrating one embodiment of the present invention showing an exemplary flow of data and inputs and outputs utilized to control the movement of the mobility scooter of FIG. 1 in accordance with some embodiments.

Referring to FIG. 6, a block diagram illustrating one embodiment of an exemplary flow of data including inputs and outputs utilized to control the movement of the mobility scooter of FIG. 1 is shown in accordance with some embodiments. This block diagram 606 shows the interconnections between an anti-collision system 606, which includes at least anti-collision circuitry (i.e., circuitry 318) and proximity sensors 602, and the controller 200. It will be understood that the inputs and outputs shown may also be connected to the anti-collision system 606 and then communicated as needed to the controller 200. It will also be understood that, while the term "controller" is used, the terms "electronic motor control circuitry" and "central control unit" may be substituted without departing from the intended scope of the invention.

In an embodiment, the anti-collision system 606 includes proximity sensors 602, which may be mounted to the front, sides and rear of the scooter 100, although sensors may also be disposed at other locations of the scooter 100. In one embodiment, the proximity sensors 602 may be ultrasonic sensors configured to monitor the space in the "line of sight" of each proximity sensor for a particular, predefined distance from the proximity sensor. Such proximity sensors 602 may detect objects, cliffs, ledges and/or persons that approach the scooter 100, such as from behind or from the side, or that are located in front of the scooter 100.

In other embodiments, the plurality of proximity sensors 602 can include sensors for sensing fields and signals, such as radio frequency (RF), RADAR, SONAR, IR, Bluetooth, RFID, cellular, Wi-Fi, electrical fields, magnetic fields, and others, to facilitate object detection, collision detection, detection of humans or animals, and the like.

The proximity of an object, cliff, ledge and/or person which is detected by one or more of the proximity sensors 602 may be used to trigger automated actions, such as, for example, decreasing speed, electronic braking, increasing speed, or triggering actions to connected peripheral devices, such as headlights, blinkers, hazard lights, personal electronic devices, bells, tactile or audible alarms, protective equipment, and the like.

The proximity sensors 602 may communicate with the processor of the anti-collision system 316 coupled to the scooter 100 to provide an alert to the user when an object is detected within a certain threshold distance. This alert may be conveyed using one or more of audible, visible, and tactile methods. As described above, one example may include providing a vibration of the handle bars, a steering wheel and/or the seat. The signals containing data related to the functioning of the proximity sensors may be transmitted using wires, or it may be transmitted using short-range wireless technologies such as wireless USB, Bluetooth, IEEE 802.11 and the like.

The processor of the anti-collision system 316 may be configured to, e.g., pre-programmed to, monitor the various proximity sensors 602 of the scooter 100 (e.g., via either a push and/or pull method of obtaining data), and then transmit one or more signals causing one or more components of the scooter 100 to take action dependent on parameters input into the memory associated with the processor. For example, the processor may be programmed to trigger certain control decisions based on certain threshold values of one or more variables. As an alternative, or in addition, to the inclusion of a processor, the anti-collision system 316 may include one or more transistors configured to handle processing. For example, as seen in FIG. 4B, the anti-collision system 316 may include circuitry 320, which includes transistors 400, 402 and 404.

Figure 7:
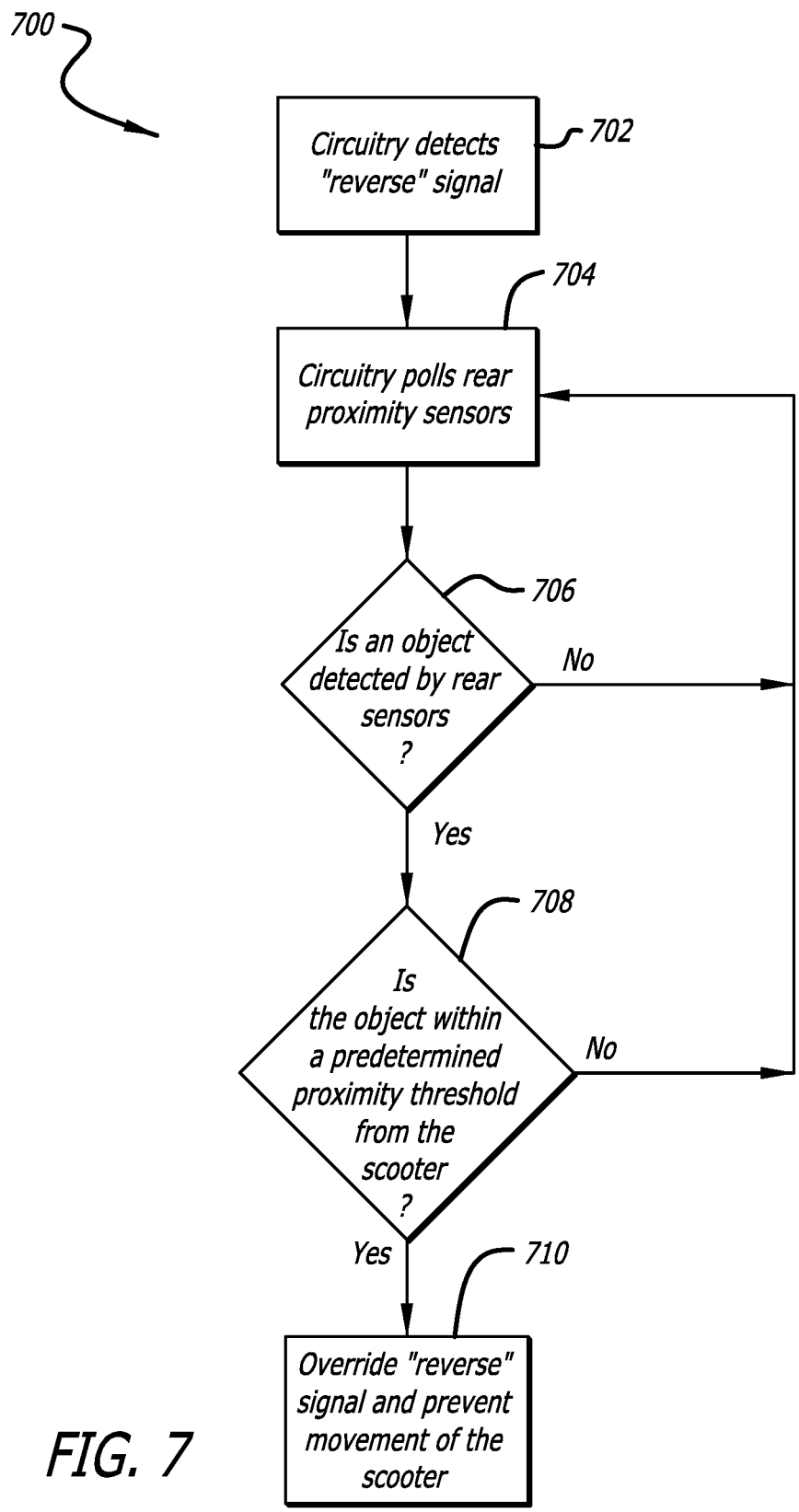
FIG. 7 is a flow diagram illustrating an exemplary function of an embodiment of the present invention in accordance with some embodiments.

Referring now to FIG. 7, a flow diagram illustrating an exemplary function of an embodiment of the present invention is shown in accordance with some embodiments. In particular, FIG. 7 illustrates a flow diagram 700 wherein proximity sensors and the anti-collision system 316 of FIG. 3B cooperate to override a reverse signal to prevent movement of the scooter 100, thus avoiding a collision. For example, as shown in FIG. 7, the circuitry 320 of the anti-collision system 316 may be configured to disallow operation of the scooter 100 in a reverse direction if the circuitry 320 receives a signal from a proximity sensor mounted on the rear of the scooter 100 indicating that a person, ledge or other object is detected within a predetermined proximity threshold of the scooter 100. In one embodiment, the predetermined proximity may be twelve inches. However, it should be noted that varying proximity thresholds may be used according to the detecting proximity sensor, e.g., such that a first proximity threshold used when an object is detected by a front proximity sensor differs from a second proximity threshold used when an object is detected by a rear proximity sensor. In other embodiments, a single proximity threshold may be used regardless of the proximity sensor that detected the object.

In this example, the circuitry 320 receives a signal indicating detection of a "reverse" signal intended to cause the motor of the scooter 100 to move in reverse (block 702). The circuitry 320 polls the rear proximity sensors to determine whether there is an object behind the scooter 100 (block 704). When an object is detected (yes at block 706), the circuitry 320 compares the data being received from the rear proximity sensor to predetermined thresholds, which may be stored in the memory associated with the circuitry 320, to determine whether the detected object is within an applicable predetermined threshold (e.g., so close as to pose a danger of collision between the scooter 100 and the object). In one example, the threshold may be 12 inches, such that the circuitry determines whether the detected object is within 12 inches. When the object is within the predetermined threshold (yes at block 708), the circuitry 320 overrides the "reverse" signal and instead issues signals to the controller 200 and/or components of the scooter 100 to prevent movement of the scooter 100 in reverse (block 710). When either an object is not detected by rear sensors (no at block 706) or a detected object is not within a proximity threshold (no at block 708), the flow chart 700 returns to block 704 to continue monitoring of the environment surrounding the scooter 100 as long as the "reverse" signal is received.

Other examples of actions that may be taken based on one or more variables can include: 1) commanding the motor control unit to control the motor to reduce speed if objects are located a predetermined distance, such as, for example, twelve feet, in front of the scooter 100; 2) commanding the motor control unit to control the motor to continuously reduce the motor speed in proportion to the distance the scooter 100 is from an object or person as the scooter 100 moves toward the object or person; 3) commanding the motor control unit to control the an emergency braking action which may include controlling the brakes to actuate and to control the motor to reverse if the scooter 100 is moving at 80% of maximum speed and an object or person is detected within 6 feet of the scooter 100; 4) commanding the motor control unit to override all control decisions if the horn button is held while turning the scooter 100 on; and 5) commanding the motor control unit to pulse at an increasing rate when approaching objects while traveling in reverse. Those skilled in the art will understand that these are just some examples of the various decisions and resulting actions that may be including in programming commands that control the operations of the circuitry.

The various embodiments of the anti-collision system 316 of the present invention is an improvement over prior art systems in that those embodiments provide enhanced safety to commercially available personal mobility scooters. More specifically, the anti-collision system 316 may be easily adapted to interface with the controller of various mobility scooters (e.g., agnostic to the controller coupled to the mobility scooter). This may be accomplished by simply changing the connectors or form factor of the anti-collision system.

The modular design of the embodiments of the present invention all those embodiments to be installed by untrained persons with relative ease, for example, in approximately 20 minutes using only a screw driver. Additionally, cables utilized by the various embodiments may use locking connectors, with keyed indicators that prevent incorrect or reversed connections. Thus, the embodiments provide an inexpensive upgrade to personal mobility scooters providing enhanced collision avoidance, no matter the environment in which the scooter is operated.

While particular embodiments of the present invention have been described, it is understood that various different modifications within the scope and spirit of the invention are possible. The invention is limited only by the scope of the appended claims.

What is claimed is:

1. A system for reducing encounters between a mobility scooter and objects or ledges, wherein the mobility scooter includes a controller that is configured to receive movement signals from electronic components of the mobility scooter via a first multi-pin connector, the controller configured to control movement based on the movement signals, the system comprising:

a second multi-pin connector configured to couple with the first multi-pin connector and intercept a first movement signal transmitted from a first electronic component of the mobility scooter to the controller of the mobility scooter, the first movement signal indicating (i) a movement variable and (ii) a direction; and an anti-collision circuitry configured to communicatively couple with (1) the second multi-pin connector, and (2) the controller via the first multi-pin connector or the second multi-pin connector:
  receive the first movement signal from the second multi-pin connector,
  receive, via the second multi-pin connector, proximity data from one or more proximity sensors,
  perform a determination as to whether the proximity data indicates that the mobility scooter is within a proximity threshold, wherein the proximity threshold corresponds to the movement variable,
  in response to determining the received proximity data indicates the mobility scooter is within the proximity threshold, overriding the first movement signal and providing one or more control signals to the controller via the second multi-pin connector and the first multi-pin connector, wherein the one or more control signals are relayed to at least a throttle, a motor or a brake of the mobility scooter; and
  in response to determining the received proximity data indicates the mobility scooter is not within the proximity threshold, allowing the first movement signal to pass to the controller.

2. The system of claim 1, further comprising:
the one or more proximity sensors communicatively coupled to the anti-collision circuitry and configured to provide the proximity data that represents a distance between the one or more proximity sensors and an object or a ledge detected by the one or more proximity sensors.

3. The system of claim 1, wherein the at least one movement variable includes at least one of accelerate, decelerate, or maintain a current speed.

4. The system of claim 1, wherein the anti-collision circuitry includes one or more processors.

5. The system of claim 1, wherein the anti-collision circuitry includes one or more transistors, wherein each of the one or more transistors is configured to analyze the proximity data received from the one or more proximity sensors.

6. The system of claim 1, wherein the one or more control signals indicate an alert is to be generated, the alert including at least one of haptic feedback, an audible alert or a visual alert.

7. The system of claim 6, wherein the haptic feedback includes a vibration of a steering wheel of the mobility scooter.

8. A method for reducing encounters between a mobility scooter and objects or ledges using an anti-collision system, wherein the mobility scooter includes a controller that is configured to receive movement signals from electronic components of the mobility scooter via a first multi-pin connector, the controller configured to control movement based on the movement signals, the method comprising:
  receiving, by anti-collision circuitry of the anti-collision system, a first movement signal from the mobility scooter from a second multi-pin connector of the anti-collision system, the first movement signal indicating a movement variable and a direction, wherein the second multi-pin connector is configured to couple with the first multi-pin connector and intercept the first movement signal transmitted from a first electronic component of the mobility scooter to the controller of the mobility scooter;
  receiving, by way of the second multi-pin connector, proximity data from one or more proximity sensors;
  performing a determination as to whether the proximity data indicates that the mobility scooter is within a proximity threshold, wherein the proximity threshold corresponds to the movement variable;
  in response to determining the received proximity data indicates the mobility scooter is within the proximity threshold, overriding the first movement signal and providing one or more control signals to the controller by way of the second multi-pin connector and the first multi-pin connector, wherein the one or more control signals are relayed to at least a throttle, a motor or a brake of the mobility scooter; and
  in response to determining the received proximity data indicates the mobility scooter is not within the proximity threshold, allowing the first movement signal to pass to the controller.

9. The method of claim 8, further comprising:
detecting, by the one or more proximity sensors communicatively coupled to the mobility scooter, the proximity data that represents a distance between the one or more proximity sensors and an object or a ledge detected by the one or more proximity sensors.

10. The method of claim 8, wherein the movement variable includes at least one of accelerate, decelerate, or maintain a current speed.

11. The method of claim 8, wherein the mobility scooter includes an anti-collision circuitry including one or more processors.

12. The method of claim 8, wherein the mobility scooter includes an anti-collision circuitry including one or more transistors, wherein each of the one or more transistors is configured to analyze the proximity data received from one or more proximity sensors.

13. The method of claim 8, wherein the one or more control signals indicate an alert is to be generated, the alert including at least one of haptic feedback, an audible alert or a visual alert.

14. The method of claim 13, wherein the haptic feedback includes a vibration of a steering wheel of the mobility scooter.

15. An apparatus for reducing encounters between a mobility scooter and objects or ledges, wherein the mobility scooter includes a controller that is configured to receive movement signals from electronic components of the mobility scooter via a first multi-pin connector, the controller configured to control movement based on the movement signals, the apparatus comprising:
  a second multi-pin connector configured to couple with the first multi-pin connector and intercept a first movement signal transmitted from a first electronic component of the mobility scooter to the controller of the mobility scooter, the first movement signal indicating (i) a movement variable and (ii) a direction; and
  an anti-collision circuitry configured to communicatively couple with (1) the second multi-pin connector, and (2) the controller via the second multi-pin connector:
    receive the first movement signal from the second multi-pin connector,
    receive, via the second multi-connector pin, proximity data from one or more proximity sensors, perform a determination as to whether the received proximity data indicates the mobility scooter is within a proximity threshold, wherein the proximity threshold corresponds to the movement variable, in response to determining the received proximity data that indicates the mobility scooter is within the proximity threshold, overriding the first movement signal and providing one or more control signals to the controller, via the second multi-pin connector and the first multi-pin connector, wherein the one or more control signals are relayed to at least a throttle, a motor or a brake of the mobility scooter; and in response to determining the received proximity data indicates the mobility scooter is not within the proximity threshold, allowing the first movement signal to pass to the controller.

16. The apparatus of claim 15, further comprising:

the one or more proximity sensors communicatively coupled to the anti-collision circuitry and configured to provide the proximity data that represents a distance between the one or more proximity sensors and an object or a ledge detected by the one or more proximity sensors.

17. The apparatus of claim 15, wherein the movement variable includes at least one of accelerate, decelerate, or maintain a current speed.

18. The apparatus of claim 15, wherein the anti-collision circuitry includes one or more transistors, wherein each of the one or more transistors is configured to analyze the proximity data received from the one or more proximity sensors.

19. The apparatus of claim 15, wherein the one or more control signals indicate an alert is to be generated, the alert including at least one of haptic feedback, an audible alert or a visual alert.

20. The apparatus of claim 19, wherein the haptic feedback includes a vibration of a steering wheel of the mobility scooter.

* * * * *